Dec. 26, 1944.   O. W. LIVINGSTON   2,366,038
ELECTRIC VALVE CONTROL CIRCUITS
Filed Feb. 28, 1942
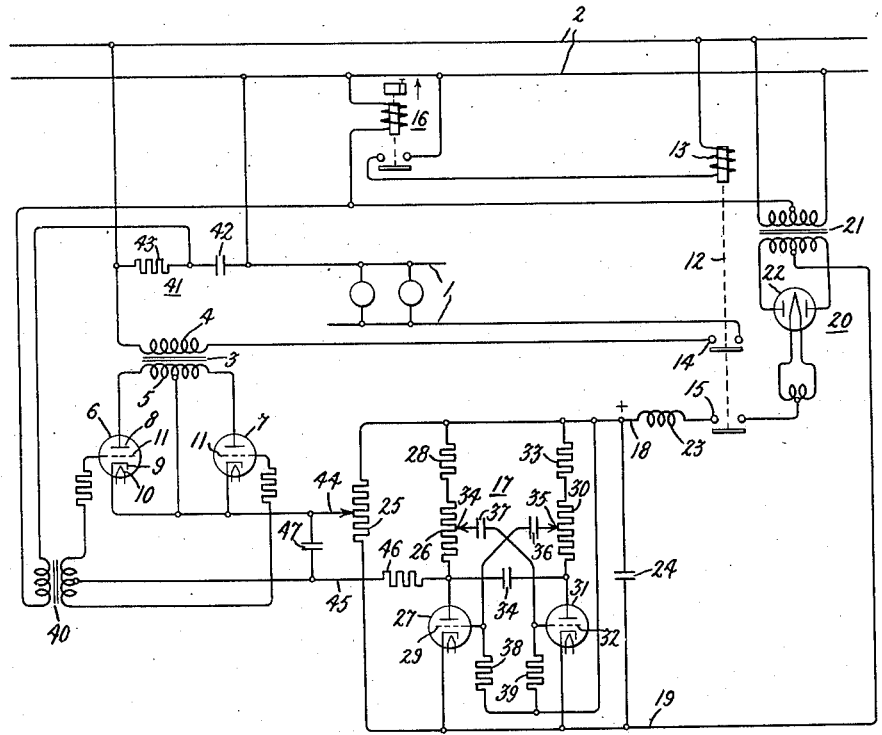
Inventor:
Orrin W. Livingston,
by Harry E. Dunham
His Attorney.

Patented Dec. 26, 1944

2,366,038

UNITED STATES PATENT OFFICE 2,366,038

ELECTRIC VALVE CONTROL CIRCUITS

Orrin W. Livingston, Scotia, N. Y., assignor to General Electric Company, a corporation of New York Application February 28, 1942, Serial No. 432,901

15 Claims. (Cl. 250—27)

My invention relates to electric valve circuits and more particularly to electric valve control circuits for electric translating apparatus.

In many applications where electric valve apparatus is employed to its greatest advantage, it is desirable to effect periodic or intermittent energization of an associated load circuit from a supply circuit.

In accordance with the teachings of my invention described hereinafter, I provide a new and improved control system for electric valve apparatus wherein precise control of the period of energization of the load circuit may be effected by employing apparatus which is of simple construction and arrangement.

It is an object of my invention to provide a new and improved electric valve translating system.

It is another object of my invention to provide a new and improved electric valve control or timing circuit.

It is a further object of my invention to provide a new and improved electric valve control circuit whereby intermittent energization of a load circuit is effected.

It is a still further object of my invention to provide a new and improved electric valve control or timing system for electric translating apparatus which effects intermittent energization of a load circuit, and which not only controls the period of each energization of the load circuit but also controls the interval of time between each successive energization of the load circuit.

It is a still further object of my invention to provide a new and improved protective system for hot cathode electric valve apparatus of the type employing an ionizable medium, such as a gas or a vapor.

Briefly stated, in the illustrated embodiment of my invention I provide an electric valve control circuit of simple construction and arrangement wherein a timing circuit of the parallel inverter type is provided for producing a periodic timing voltage which controls the conductivity of electric valve apparatus which in turn controls the energization of a load circuit. The timing circuit produces a periodic voltage, successive impulses of which are of opposite polarity. The impulses of one polarity control the period or duration of each energization of the load circuit, and the impulses of opposite polarity control the intervals of time between successive energizations of the load circuit. The timing circuit may be controlled or adjusted to control the ratio of the period of energization to the period of deenergization of the load circuit, and also includes means for controlling the frequency of occurrence of the energizations of the load circuit.

For a better understanding of my invention, reference may be had to the following description taken in connection with the accompanying drawing, and its scope will be pointed out in the appended claims. The single figure of the drawing diagrammatically illustrates an embodiment of my invention as applied to a system for effecting intermittent energization of a load circuit, such as a lighting circuit.

Referring now to the single figure of the drawing, I have there illustrated my invention as applied to an electric valve translating system for energizing a load circuit 1, such as a lighting circuit, from an alternating current supply circuit 2. While my invention has been illustrated as applied to an arrangement which energizes a lighting circuit, it will be understood that my invention in its broader aspects is applicable to electric circuits generally where it is desired to effect energization of a load circuit intermittently. For example, my invention may be applied to electric resistance welding systems wherein it is desired to effect energization of a welding circuit intermittently.

The energization of the load circuit 1, or the voltage applied thereto to effect intermittent energization, may be controlled by means of a variable impedance means, such as a transformer 3 having a primary winding 4 connected in series relation with the load circuit 1 across the alternating current supply circuit 2. Transformer 3 also includes a secondary winding 5 the current through which is controlled to control or vary the effective impedance of the primary winding 4. Electric valve means 6 and 7 may be connected to the secondary winding 5 to control the current conducted thereby and, hence, to control the effective impedance of winding 4. The electric valve means 6 and 7 are preferably of the type employing an ionizable medium, such as a gas or a vapor, and each comprises an anode 8, a cathode 9, a cathode heating element 10 and a control member 11.

If desired, I may employ a contactor 12 for delaying the closure of the load circuit 1 for a predetermined interval of time after the energization of supply circuit 2, thereby permitting the cathodes 9 to assume a safe operating temperature. The cathode heating elements 10 may be energized from the supply circuit 2. The contactor 12 may comprise an actuating coil 13 and contacts 14 and 15, the former of which are connected in series relation with the load circuit 1 and primary winding 4 of transformer 3 The delay in the operation of the contactor 12 may be effected by means of the time delay relay 16 which is arranged to close its contacts a predetermined interval of time after the energization of the supply circuit 2.

I provide a timing circuit 17 which produces a periodic or alternating voltage for controlling the periodicity of the energizations of the load circuit 1, and which also controls the duration of each period of energization and the intervals of time between successive energizations. The periodic voltage produced by the timing circuit 17 is of the type in which successive impulses of timing voltage are of opposite polarity, impulses of one polarity serving to control the period of energization of the load circuit, and the impulses of the opposite polarity serving to control the interval of time between energizations.

Referring more particularly to the timing means 17, I provide a source of direct current comprising a positive conductor 18 and a negative conductor 19. The source of direct current may be provided by means of a rectifier, such as a biphase rectifier 20, comprising a transformer 21 and a pair of unidirectional conducting paths such as that provided by an electric discharge device 22 comprising two anodes and a single associated cathode. If desired, filtering means such as a smoothing inductance 23 and a capacitance 24, may be employed so that the output voltage of the rectifier 20 is substantially constant. A suitable means such as a voltage divider comprising an impedance means, such as a resistance 25, may be connected across the direct current source to establish a point of reference potential. A pair of electric paths are also energized from the source and cooperate with resistance 25 to produce the periodic timing voltage. One of the discharge paths comprises in series relation an impedance element such as a resistance 26 and an electric discharge device 27. If desired, a further resistance 28 may also be connected in series relation with these elements. The electric discharge device 27 is preferably of the type employing an ionizable medium and comprises a control grid 29.

The other discharge path comprises in series relation an impedance element, such as a resistance 30, and an electric discharge device 31, also preferably of the type employing an ionizable medium and including a control grid 32. A further resistance 33 may be connected in series relation with these elements if it is desired.

In order to commutate the current between the electric paths of the timing circuit 17, that is to transfer the current from one discharge device which is then conducting to a non-conducting discharge device, I connect across the parallel electric paths a suitable commutating means such as a capacitance 34.

Resistances 26 and 30 may be provided with suitable taps 34 and 35, respectively, to control not only the periodicity of the energizations of the load circuit 1, but also to control independently the periods of energization of the load circuit and the periods of deenergization of the load circuit.

To control the potentials of grids 29 and 32 of the electric discharge devices 27 and 31, respectively, I provide circuits which are crisscrossed and which comprise capacitances 36 and 37 and resistances 38 and 39, respectively, which are connected between contacts 35 and 34 and the positive conductor 18 of the direct current source.

Although not limited thereto, I have found that in the control of the conductivities of the electric valve means 6 and 7 I may impress on the control members 11 of the electric valve means voltages each of which is the resultant of an alternating component of voltage and the periodic voltage produced by the timing circuit 17. The alternating component of voltage may be displaced to the 90° lagging position relative to the respective anode-cathode voltages, and may be provided by means of a transformer 40 which is energized from a phase shifting circuit 41 comprising a conductor 42 and a resistance 43.

The periodic voltage produced by timing circuit 17 is impressed on the control members 11 of electric valve means 6 and 7 by means of a circuit including conductors 44 and 45, which constitute an output circuit for the timing circuit. It will be noted that the conductor 45 is connected to the anode of an electric discharge device in one of the parallel electric paths. More particularly, it is connected to the anode of the electric discharge device 27 through resistance 46.

It is sometimes desirable in systems which employ hot cathode electric valves of the type comprising ionizable mediums to delay the application of load or to apply the load at a slow rate in order that the cathode may assume a safe operating temperature. Of course, it should be realized that the temperature of the cathode may be independently controlled by the control of the amount of current transmitted to the cathode heating element. However, the transmission of anode-cathode current also affects the temperature of the cathode and in many applications it is desirable to control the rate at which the electric valve means assumes the load current.

In order to meet the requirements of this type of application, the circuit including conductors 44 and 45 may comprise reactive means for delaying the application of the periodic voltage to the control members 11. For example, the time delay means may comprise in series relation a resistance 46 and a capacitance 47.

The operation of the embodiment of my invention shown in the single figure of the drawing will be explained by considering the system when it is operating to effect intermittent energization of the load circuit 1. Of course, the system is initiated in its operation by the energization of the supply circuit 2. After a predetermined interval of time, the time delay relay 16 closes its contacts thereby effecting energization of the actuating coil 13 of contactor 12 which causes the closure of contacts 14 and 15. Contacts 14 close the load circuit, and the contacts 15 connect the source of direct current to the timing circuit 17. Current is not transmitted immediately to the load circuit 1 because the impedance of the primary winding 4 of transformer 3 is high, thereby limiting the current to a very small or negligible value.

Timing circuit 17 produces a periodic voltage which renders the electric valve means 6 and 7 alternately conducting and nonconducting to effect intermittent energization of the load circuit 1. The periodic voltage is of the type in which successive impulses are of opposite polarity; the positive impulses render the electric valves 6 and 7 conducting, and the duration of the positive impulses controls the period of energization of the load circuit 1. The negative impulses maintain the electric valve means 6 and 7 nonconducting and control the interval of time between each energization of the load circuit 1. The resultant voltages impressed on control members 11 of electric valve means 6 and 7 each constitute two components, one an alternating component having a 90° lagging phase relationship with respect to the anode-cathode voltages of electric valve means 6 and 7, and the other component which is the periodic voltage. The two components act conjointly to control the conductivities of the electric valve means.

The manner in which the timing circuit 17 produces the periodic voltage will now be considered. Conductor 44, which is connected to the voltage divider comprising resistance 25, establishes a point of reference potential, and the conductor 45, which is connected to the anode of the electric discharge device 27 through resistance 46, rises above and falls below the point of reference potential by operation of the two electric paths in the timing circuit. The system would also operate satisfactorily if the conductor 45 were connected to the anode of the electric discharge device 31. With the arrangement of connections illustrated, the negative impulse is produced during the interval of time within which the electric discharge device 27 conducts current, and the positive impulse of current is produced during the interval of time during which the electric discharge device 31 conducts current.

If it be assumed that the electric discharge device 27 conducts current, current consequently is transmitted from the direct current source through resistances 28 and 26 and electric discharge device 27. During this operation the right-hand plate of capacitance 34 is charged positively through a circuit including resistance 33, resistance 30, capacitance 34 and electric discharge device 27. During this same operation, the potential of the grid 32 of electric discharge device 31 is gradually raised, that is made more positive with respect to its associated cathode. This control is effected by the gradual charging of capacitance 37 through a circuit including the positive conductor 18 of the direct current source, resistance 39, capacitance 37, contact 34, the lower portion of resistance 26, electric discharge device 27, and the negative conductor 19 of the direct current source. When the potential of grid 32 attains a sufficiently high value established by the grid control characteristic of the electric discharge device 31, discharge device 31 is rendered conducting. Due to the charge of the capacitance 34, when the discharge device 31 is rendered conducting the electric discharge device 27 is rendered nonconducting, the capacitance 34 serving as a commutating means to transfer the current from the left-hand path to the right-hand electric path.

During the operation described immediately preceding, it will be observed that conductor 45, which is connected to the left-hand terminal of the capacitance 34, has been negative due to the fact that the capacitance 34 was charged in this manner.

During the interval of time within which the electric discharge device 31 is conducting, a positive potential is impressed on the conductor 45 due to the fact that the capacitance 34 is charged in the opposite direction. The circuit through which the capacitance 34 is charged includes the following elements: resistance 28, resistance 26, capacitance 34, and electric discharge device 31. During this same operation, the potential of the grid 29 of discharge device 27 is gradually raised from a negative potential, which maintains the discharge device nonconducting, to a positive potential which is sufficient to render it conducting through a circuit including the positive conductor 18 of the direct current source, resistance 38, capacitance 36, contact 35, the lower portion of resistance 30, electric discharge device 31, and the negative conductor 19 of the direct current source. When the potential of grid 29 reaches a predetermined value established by the grid control characteristic of discharge device 27, discharge device 27 is rendered conducting and due to the charge of capacitance 34 current is commutated from discharge device 31 to discharge device 27, thereby terminating the positive impulse of the periodic timing voltage and initiating another negative impulse.

The duration of the positive and negative impulses and the frequency of the timing voltage are independently or jointly controllable by means of contacts 34 and 35 associated with resistances 26 and 30, respectively. As the contacts 34 and 35 are moved upward, the duration of the positive and negative impulses are decreased and consequently the frequency of energization of the load circuit 1 is increased. Conversely, if the contacts 34 and 35 are moved downward, the durations of the positive and negative impulses are increased and the frequency of the energization of the load circuit 1 is decreased.

By means of contacts 34 and 35, independent adjustment of the absolute durations of the periods of energization and the periods of deenergization of the load circuit 1 is obtained. When the contact 34 is moved upward, the period of deenergization of the load circuit 1 is decreased, and when it is moved downward the period of deenergization of the load circuit is increased. In like manner, when the contact 35 is moved upward, the interval of time between successive energizations of the load circuit is decreased, and when contact 35 is moved downward, the interval of time between successive energizations of the load circuit is increased.

The circuit 17 provides independent adjustment of the period of energization and the period of deenergization of load circuit 1. Furthermore, this independent adjustment permits control of the time of energization and the time of deenergization in half cycle or cycle steps. The ratio of the periods of energization to the periods of deenergization may be controlled by adjusting contacts 34 and 35 conjointly or by controlling either one independently of the other.

The time delay circuit including resistance 46 and capacitance 47 connected between the timing circuit and the electric valve means 6 and 7 delays or slows the rate of increase of the timing voltage impressed on control members 11 of electric valve means 6 and 7, thereby causing the electric valve means 6 and 7 to assume load gradually and consequently affording a protection for the cathodes 9.

The time delay feature also protects the lamps connected in the load circuit 1. Due to the fact that the voltage and current supplied to the load circuit are increased gradually, the duty imposed on the lamps is reduced thereby increasing the life of the lamp load.

In some applications, such as welding applications, where it is desired to control accurately the amount of current supplied to the welding circuit during the entire period of energization of the load circuit, it may not be desirable to use the time delay means comprising the resistance 46 and capacitance 47, in which case these elements may be omitted and the timing circuit 17 may be employed directly for controlling the current supplied to a welding circuit during accurately determinable intervals of time, and for also controlling the time between successive energizations of the welding circuit.

The manner in which the electric valve means 6 and 7 control the voltage impressed across the load circuit 1 will now be considered. When the electric valve means 6 and 7 are rendered conducting during the intervals of time established by the positive impulses of the timing circuit 17, the electric valve means 6 and 7 conduit current alternately, thereby decreasing the impedance of the primary winding 4 of transformer 3 and effecting the application of voltage to the load circuit 1. During the negative impulses of voltage produced by timing circuit 17, the electric valve means 6 and 7 are maintained nonconducting, thereby materially and substantially increasing the impedance of the primary winding 4 so that the voltage and current applied to the load circuit 1 is at a very low or negligible value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus connected between said circuits and comprising electric valve means having a control member, and means for controlling the conductivity of said electric valve means to effect intermittent energization of said load circuit and comprising a source of direct current, a voltage divider connected across said source, a pair of electric paths connected across said source and each path comprising in series relation a resistance and an electric discharge device having a grid, means for energizing the grids to render the discharge devices conducting alternately to produce across a point on one of said paths and a point on said voltage divider a periodic voltage of which successive impulses are opposite in polarity, and a circuit connected between said points for impressing said voltage on said control member to render said valve means conductive when one of said devices is conducting and nonconductive when the other of said devices is conducting.

2. In combination, an alternating current supply circuit, a load circuit, electric translating apparatus connected between said circuits and comprising electric valve means having a control member, means for controlling the conductivity of said electric valve means to effect intermittent energization of said load circuit and comprising a source of direct current, a pair of electric paths connected across said source and each comprising in series relation a resistance and an electric discharge device having a grid, commutating means connected across said electric paths, means connected between the grids of the electric discharge devices and said source for energizing the grids so that the discharge devices conduct current alternately, a voltage divider connected across said source, means connecting a point on one of said paths and a point of said voltage divider to the control member of said electric valve means so that said electric valve means is rendered conducting when the discharge device in one of said paths is conducting and is maintained nonconducting when the other of said discharge devices is conducting, and independent means associated with each of the resistances in said pair of discharge paths for controlling the voltage impressed on said control member to control the interval of conduction of the discharge device associated with each of said paths.

3. In combination, a supply circuit, a load circuit, electric translating apparatus connected between said circuits and comprising electric valve means having a control member, means for controlling the conductivity of said electric valve means to effect intermittent energization of said load circuit and comprising a source of direct current, a voltage divider connected across said source, means for producing a periodic voltage of which successive impulses are of opposite polarity and comprising two electric paths connected across said source and each comprising in series relation a resistance and an electric discharge device having a grid and means for energizing said grids to render the discharge devices conducting alternately, and a circuit for impressing said periodic voltage on said control member and being connected between one of the electric paths and a point of the voltage divider so that said valve means is conductive when said periodic voltage is of one polarity and is nonconductive when said periodic voltage is of the opposite polarity.

4. In combination, a supply circuit, a load circuit, electric translating apparatus connected between said circuits and comprising electric valve means having a control member, means for controlling the conductivity of said electric valve means to effect intermittent energization of said load circuit and comprising a source of direct current, a voltage divider connected across said source, means for producing a periodic voltage of which successive impulses are of opposite polarity and for effecting control of the duration of the periods of energization of said load circuit and for controlling the interval of time between each energization of said load circuit and comprising two electric paths connected across said source and each comprising in series relation a resistance and an electric discharge device having a grid and means for energizing said grids to render the discharge devices conducting alternately, and a circuit for impressing said periodic voltage on said control member and being connected between a point of said voltage divider and one of the discharge paths and including time delay means for delaying the application of the periodic voltage to said control member.

5. In combination, a supply circuit, a load circuit, electric translating apparatus connected between said circuits and comprising electric valve means having a control member, means for controlling the conductivity of said electric valve means to effect intermittent energization of said load circuit and comprising a source of direct current, a voltage divider connected across said source, means for producing a periodic voltage of which successive impulses are of opposite polarity and for effecting control of the duration of the periods of energization of said load circuit and for controlling the interval of time between each energization of said load circuit and comprising two electric paths connected across said source and each path comprising in series relation a resistance and an electric discharge device having a grid and means for energizing said grids to render the discharge devices conducting alternately, and a circuit comprising reactive means connected between a point of said voltage divider and one of the electric paths for delaying the application of said periodic voltage to said control member.

6. In combination, a supply circuit, a load circuit, electric translating apparatus connected between said circuits and comprising electric valve means having a control member, means for controlling the conductivity of said electric valve means to effect intermittent energization of said load circuit and comprising a source of direct current, a voltage divider connected across said source, means for producing a periodic voltage of which successive impulses are of opposite polarity and for effecting control of the duration of the periods of energization of said load circuit and for controlling the interval of time between successive energizations of said load circuit and comprising two electric paths connected across said source and each path comprising in series relation a resistance and an electric discharge device having a grid and means for energizing said grids to render the discharge devices conducting alternately, and a circuit connected between a point of said voltage divider and one of the electric paths and comprising in series relation a resistance and a capacitance for delaying the application of said periodic voltage to said control member.

7. In combination, a source of direct current, an output circuit, and means for transmitting to said output circuit an alternating periodic voltage comprising a pair of electric paths connected across said source each comprising in series relation a resistance and an electric discharge device having a grid, a commutating capacitance connected across said electric paths, means for energizing said grids to render said discharge devices conducting alternately and a voltage divider connected across said source, said output circuit being connected across a point of said voltage divider and one of said electric paths so that each alternation of said voltage corresponds to the period of conduction of one of said devices.

8. In combination, a source of direct current, an output circuit, means for transmitting an alternating periodic voltage to said output circuit and comprising a pair of electric paths connected across said source and each comprising in series relation a resistance and an electric discharge device having a grid, means connected with said resistances for energizing said grids to render said discharge devices conducting alternately, a commutating capacitance connected across said electric paths and a voltage divider connected across said source, said output circuit being conductively connected between a point of said voltage divider and one of said electric paths, and means for adjusting the connections of said second-mentioned means with the resistances in said electric paths to control the periodicity of said periodic voltage.

9. In combination, a source of direct current, an output circuit, means for transmitting an alternating periodic voltage to said output circuit and comprising a pair of electric paths connected across said source and each comprising in series relation a resistance and an electric discharge device having a grid, means connected with said resistances for energizing said grids to render said discharge devices conducting alternately, a commutating capacitance connected across said electric paths and a voltage divider connected across said source, said output circuit being connected between a point of said voltage divider and one of the electric paths, and means for adjusting the connections of said second-mentioned means with at least one of the resistances to control the ratio of the positive and negative impulses of said periodic voltage.

10. In combination, a source of direct current, an output circuit, and means for supplying an alternating periodic voltage to said output circuit and comprising a pair of electric paths each comprising in series relation a resistance and an electric discharge device having a grid, a commutating capacitance connected across said electric paths, crisscrossed grid circuits energized from said source for rendering the discharge devices conducting alternately and each comprising a capacitance connected between its grid and the resistance in series relation with the other electric discharge device and a voltage divider connected across said source, said output circuit being connected between a point of said voltage divider and said one of said electric paths.

11. In combination, a supply circuit, a load circuit, electric translating apparatus connected between said circuits and comprising electric valve means having a control member, and means for controlling the conductivity of said electric valve means to effect intermittent energization of said load circuit and comprising a source of direct current, means for establishing a point of reference potential, a pair of electric paths connected across said source and each path comprising in series relation a resistance and an electric discharge device having a grid, means for energizing the grids to render the discharge devices conducting alternately and a circuit connected between said control member, said point of reference potential and one of the electric paths to impress on said control member a periodic voltage for controlling the duration of the periods of energization of said load circuit and the intervals of time between successive energizations of said load circuit.

12. In combination, a source of direct current, an output circuit, and means for supplying to said output circuit an alternating voltage having positive and negative portions and comprising a pair of electric paths each comprising in series relation a resistance and an electric discharge device having a grid, a commutating capacitance connected across said electric paths, crisscrossed grid circuits energized from said source for rendering the discharge devices conducting alternately and each comprising a capacitance connected between its grid and the resistance in series relation with the other discharge device, means for producing a point of reference potential, said output circuit being connected between said point of reference potential and said one of said discharge paths and means for adjusting the connection of the grid circuits to the resistances in said pair of electric paths to control the periodicity of said alternating voltage.

13. In combination, a source of direct current, an output circuit, and means for supplying to said output circuit an alternating voltage having positive and negative portions and comprising a pair of electric paths each comprising in series relation a resistance and an electric discharge device having a grid, a commutating capacitance connected across said electric paths, crisscrossed grid circuits energized from said source for rendering the discharge devices conducting alternately and each comprising a capacitance connected between its grid and the resistance in series relation with the other discharge device, means for producing a point of reference potential, said output circuit being connected between said point of reference potential and said one of said discharge paths and means for independently adjusting the connection of the grid circuits to the resistances in said pair of electric paths to control the ratio of the positive and negative portions of said alternating voltage.

14. In combination, an alternating current circuit, a load circuit, electric translating apparatus interconnecting said circuits including electric valve means having a control electrode, said electric valve means being of the type employing an ionizable medium, an excitation circuit for energizing said control member to control the conductivity of said valve means including means for impressing on said control member a voltage component tending to maintain said valve means nonconducting, means including timing means for periodically impressing on said excitation circuit a component of voltage which tends to render said valve means conductive at a predetermined instant in the voltage wave of said alternating current circuit, and means including an energy storage device connected between said last-mentioned means and said control member to effect the gradual application of said last-mentioned component of voltage and thereby to advance gradually the instant of ignition of said electric valve means until ignition at said predetermined instant is attained.

15. In combination, a source of direct current voltage, a pair of parallel paths connected across said circuit and each including in series a resistance and an electric discharge device having an anode, a cathode, and a control member, each of said discharge devices being of the type utilizing an ionizable medium and having a critical voltage of said control member above which said electric valve means is rendered conductive, crisscross grid connections from each of said paths to the control member of the electric valve of the other path, each of said connections including a capacitance, means establishing a circuit from each of said control members to a point of voltage substantially positive with respect to the cathodes of said electric discharge devices so that the voltage of said capacitors changes rapidly to provide a rapid change of voltage of said control members in the region of the critical voltage of the associated electric discharge devices, and commutating means for effecting the transfer of current from one of said devices to the other when the grid of said other device becomes more positive than the critical voltage thereof.

ORRIN W. LIVINGSTON.